US010106383B2

(12) United States Patent
Shen et al.

(10) Patent No.: US 10,106,383 B2
(45) Date of Patent: Oct. 23, 2018

(54) INVENTORY ITEM MANAGEMENT SYSTEM, TRANSPORTING ROBOTS AND THE METHOD FOR TRANSPORTING INVENTORY HOLDER

(71) Applicant: Zhejiang Guozi Robot Technology Co., Ltd, Zhejiang (CN)

(72) Inventors: Zhenhua Shen, Zhejiang (CN); Weifeng Wu, Zhejiang (CN); Wangdong Wu, Zhejiang (CN); Yikun Tao, Zhejiang (CN); Hongbo Zheng, Zhejiang (CN); Lingfen Zhu, Zhejiang (CN); Xia Wang, Zhejiang (CN); Xinfeng Du, Zhejiang (CN)

(73) Assignee: ZHEJIANG GUOZI ROBOT TECHNOLOGY CO. LTD., Zhejiang (CN)

( * ) Notice: Subject to any disclaimer, the term of this patent is extended or adjusted under 35 U.S.C. 154(b) by 3 days.

(21) Appl. No.: 15/305,573

(22) PCT Filed: Oct. 9, 2016

(86) PCT No.: PCT/CN2016/101603
§ 371 (c)(1),
(2) Date: Jan. 11, 2017

(87) PCT Pub. No.: WO2018/064839
PCT Pub. Date: Apr. 12, 2018

(65) Prior Publication Data
US 2018/0099811 A1    Apr. 12, 2018

(51) Int. Cl.
*B66F 9/06*    (2006.01)
*B66F 7/28*    (2006.01)
(Continued)

(52) U.S. Cl.
CPC ............ *B66F 9/063* (2013.01); *B65G 1/0492* (2013.01); *B65G 1/137* (2013.01); *B66F 3/08* (2013.01);
(Continued)

(58) Field of Classification Search
CPC . B65G 1/0492; B66F 3/08; B66F 7/28; B66F 9/063
See application file for complete search history.

(56) References Cited

U.S. PATENT DOCUMENTS 4,356,887 A * 11/1982 Fisher ................... B66F 11/042
                                                               182/148
7,073,634 B2    7/2006 Mitchell et al.
(Continued)

FOREIGN PATENT DOCUMENTS

CN        1886313 A    12/2006
CN    203921937 U  * 11/2014  ............. B65G 35/00
(Continued)

*Primary Examiner* — Thomas Randazzo
(74) *Attorney, Agent, or Firm* — Seed IP Law Group LLP

(57) ABSTRACT

The present invention discloses an inventory item management system, transporting robots and the method for transporting inventory holder, wherein the transporting robot comprises a lifting unit and a horizontal rotation unit, the lifting unit comprises a first power unit, a lifting shaft and a first supporting part, and the first power unit configured to drive the first supporting part to move along the lifting shaft; the horizontal rotation unit comprises a second supporting part and a second power unit which drives the second supporting part, and the second supporting part and the first supporting part are connected rotatably. The lifting unit has a hollow hole which is disposed in vertical direction internal to the lifting unit, and the lifting shaft is located on one side of the hollow hole. The inventory item management system of the present invention transports the inventory holder with required items to the manual picking table automatically via (Continued)

the transporting robots, and the transporting robots again carry the inventory holders they transported back to the designated positions after manual picking. The present invention increases the transport efficiency of the transporting robots and the management efficiency of the entire inventory item management system, and reduces the costs.

27 Claims, 2 Drawing Sheets

(51) Int. Cl.
    *B66F 3/08*     (2006.01)
    *B65G 1/04*     (2006.01)
    *B65G 1/137*     (2006.01)
    *B66F 7/06*     (2006.01)
    *B66F 7/14*     (2006.01)
    *G05D 3/00*     (2006.01)

(52) U.S. Cl.
    CPC .............. *B66F 7/0625* (2013.01); *B66F 7/14* (2013.01); *B66F 7/28* (2013.01); *G05D 3/00* (2013.01)

(56) References Cited

U.S. PATENT DOCUMENTS

| | | | |
|---|---|---|---|
| 7,850,413 B2* | 12/2010 | Fontana | B66F 3/08 |
| | | | 414/331.14 |
| 9,731,896 B2* | 8/2017 | Elazary | B65G 1/1373 |
| 2012/0321423 A1 | 12/2012 | MacKnight et al. | |
| 2015/0376563 A1* | 12/2015 | Husemann | C12M 23/14 |
| | | | 435/289.1 |
| 2016/0236869 A1 | 8/2016 | Kimura et al. | |
| 2017/0051240 A1* | 2/2017 | Husemann | C12M 23/52 |
| 2017/0144873 A1* | 5/2017 | Colantonio | B66F 9/063 |
| 2017/0283171 A1* | 10/2017 | High | B65G 1/0492 |
| 2018/0058739 A1* | 3/2018 | Zou | F25B 49/00 |

FOREIGN PATENT DOCUMENTS

| | | |
|---|---|---|
| CN | 203921937 U | 11/2014 |
| CN | 105593143 A | 5/2016 |
| CN | 105712249 A | 6/2016 |
| CN | 105712253 A | 6/2016 |
| CN | 105947506 A | 9/2016 |

* cited by examiner

INVENTORY ITEM MANAGEMENT SYSTEM, TRANSPORTING ROBOTS AND THE METHOD FOR TRANSPORTING INVENTORY HOLDER

FIELD OF THE INVENTION

The present invention relates to the field of robots, in particular, to an inventory item management system, transporting robots and the method for transporting inventory holder.

DESCRIPTION OF THE PRIOR ART

Transporting robot, which is also referred to as automated guided vehicle (AGV), is a device applied to automated material transporting, which has a lot of benefits, such as high automaticity, flexible applications, safety and reliability, high efficiency and convenient maintenance, and the like, thus it has broad applications in the fields of logistics and transportation in auto manufacturing industries, food industries, tobacco industries, engineering and machinery industries, and it also contributes a lot in public service places such as airdromes, hospitals and office buildings. These advantages also allow transporting robots to become key equipments in modern logistics systems, to become one of the important members in the program of "substituting robots for people". The current unmanned transportation techniques mostly adopt direct lift mode, the goods will rotate together while turning. For the cases of large loads, the inertial moments of the goods are quite large, thereby increasing the costs of the motor power and energy consumption.

With respect to KIVA transporting robots disclosed by U.S. Pat. No. 7,850,413B2, since its lifting and rotation are controlled by a single motor, the body needs to rotate while lifting, causing the lifting process to be slow and affect the efficiency. With respect to the domestic invention application (CN105712249A) with separated lifting and rotation, it partly adopts a hollow large guided screw to lift, the cost of which is high; and for the application (CN105712253A) with the hydraulic pressure or electric cylinder to lift, hydraulic systems need to have larger volume and weight, which is adverse to the miniaturization and lightweight of the entire body; for those with electric cylinder to lift, because its rotation module is located in the lower part of the lifting module, it will cause the lifting module to rotate together while the rotation module rotates, which will affect the routing.

Therefore, those skilled in the art are devoted to developing an inventory item management system, transporting robots and the method for transporting inventory holder in order to increase the transport efficiency of the transporting robots and the management efficiency of the entire inventory item management system, and reduce the costs.

SUMMARY OF THE INVENTION

In view of the above-mentioned drawbacks in the prior art, the technical problems need to be solved by the present invention are how to improve the transport efficiency of the transporting robots, by changing the rotation and the lifting structures of the transporting robots.

To achieve the above-mentioned goals, the present invention provides a transporting robot, comprising a lifting unit and a horizontal rotation unit, the lifting unit comprises a first power unit, a lifting shaft and a first supporting part, the first power unit is configured to drive the first supporting part to move along the lifting shaft; the horizontal rotation unit comprises a second supporting part and a second power unit which drives the second supporting part, the second supporting part and the first supporting part are connected rotatably.

Furthermore, the lifting unit has a hollow hole, and the hollow hole is disposed in vertical direction internal to the lifting unit, and the lifting shaft is located on one side of the hollow hole.

Furthermore, the lifting unit further comprises a position-limit mechanism, and the position-limit mechanism is configured to limit the movement of the first supporting part in a direction perpendicular to the ground.

Furthermore, the position-limit mechanism is one of linear guide rail, linear bearing and oil free bushing.

Furthermore, the lifting shaft is a solid guided screw.

Furthermore, the transporting robot further comprises a sensing unit.

Furthermore, the sensing unit is located within the hollow hole, and the sensing unit is an upward-looking sensor and/or a downward-looking sensor.

Furthermore, the sensing unit is a reference mark, and the reference mark is an active mark or a passive mark.

Furthermore, the active mark is a RFID tag.

Furthermore, the passive mark is a pattern tag, a machine-readable code tag or a text tag.

Furthermore, the transporting robot further comprises a driving unit, the driving unit comprises two driving wheels, and the driving wheels are configured to cause the transporting robot to go forward, go backward, turn and rotate in situ.

Furthermore, the first power unit comprises a first transmission mechanism, and the first transmission mechanism is a synchronous belt transmission mechanism or a gear transmission mechanism.

Furthermore, the second power unit comprises a second transmission mechanism, and the second transmission mechanism is a gear transmission mechanism or a worm gear driven mechanism.

Furthermore, the first power unit comprises a first self-locking mechanism, and the first self-locking mechanism is configured to lock the first supporting part when the first power unit is powered down.

Furthermore, the second power unit comprises a second self-locking mechanism, the second self-locking mechanism is configured to lock the second supporting part and the first supporting part, and the self-locking is either power-down self-locking or mechanical self-locking.

The present invention further provides a method for transporting inventory holders by a transporting robot, the method comprising the following steps:

Step 1. The transporting robot moves to the bottom of the inventory holder located in a first position, lifting the inventory holder;

Step 2. The transporting robot moves to a second position, carrying the inventory holder;

Step 3. The transporting robot puts down the inventory holder, then moves away from the bottom of the inventory holder;

Wherein the transporting robot comprises a driving unit, a lifting unit and a horizontal rotation unit, the lifting unit comprises a first power unit, a lifting shaft and a first supporting part, the first power unit is configured to drive the first supporting part to move along the lifting shaft; the horizontal rotation unit comprises a second supporting part and a second power unit which drives the second supporting part, the second supporting part and the first supporting part are connected rotatably; the lifting unit has a hollow hole, the hollow hole is disposed in vertical direction internal to the lifting unit, and the lifting shaft is located on one side of the hollow hole.

Furthermore, when the transporting robot turns with the inventory holder on it, the transporting robot and the inventory holder are stationary relative to each other.

Furthermore, when the transporting robot rotates in situ with the inventory holder on it, the transporting robot causes the transporting robot to rotate in situ by the driving unit, meanwhile, the horizontal rotation unit rotates reversely so that the second supporting part and the inventory holder remain stationary relative to the ground.

Furthermore, when the transporting robot carries the inventory holder on it and revolves the inventory holder, the transporting robot causes the transporting robot to rotate in situ by the driving unit, and drives the second supporting part and the inventory holder to rotate together, or the transporting robot drives the second supporting part and the inventory holder to rotate by the rotation of the horizontal rotation unit.

The present invention further provides an inventory item management system, comprising a plurality of inventory holders and transporting robots, the transporting robot comprises a lifting unit and a horizontal rotation unit, the lifting unit comprises a first power unit, a lifting shaft and a first supporting part, the first power unit is configured to drive the first supporting part to move along the lifting shaft; the horizontal rotation unit comprises a second supporting part and a second power unit which drives the second supporting part, the second supporting part and the first supporting part are connected rotatably.

Furthermore, the lifting unit has a hollow hole, and the hollow hole is disposed in vertical direction internal to the lifting unit, and the lifting shaft is located on one side of the hollow hole.

Furthermore, the lifting unit further comprises a position-limit mechanism, and the position-limit mechanism is configured to limit the movement of the first supporting part in a direction perpendicular to the ground.

Furthermore, the lifting shaft is a solid guided screw.

Furthermore, the transporting robot further comprises a sensing unit, and the sensing unit is an upward-looking sensor and/or a downward-looking sensor.

Furthermore, the transporting robot further comprises a sensing unit, the sensing unit is a reference mark, and the reference mark is an active mark or a passive mark.

Furthermore, the active mark is a RFID tag, and the passive mark is a pattern tag, a machine-readable code tag or a text tag.

Furthermore, the transporting robot further comprises a driving unit, the driving unit comprises two driving wheels, and the driving wheels are configured to cause the transporting robot to go forward, go backward, turn and rotate in situ; the first power unit comprises a first transmission mechanism, and the first transmission mechanism is a synchronous belt transmission mechanism or a gear transmission mechanism; the second power unit comprises a second transmission mechanism, and the second transmission mechanism is a gear transmission mechanism or a worm gear driven mechanism.

Furthermore, the first power unit comprises a first self-locking mechanism, and the first self-locking mechanism is configured to lock the first supporting part when the first power unit is powered down; the second power unit comprises a second self-locking mechanism, and the second self-locking mechanism is configured to lock the second supporting part and the first supporting part.

For a more complete understanding of the purposes, features and effects of the present invention, the conceptions, specific structures and resultant technical effects will be explained in a further detail herein, taken in conjunction with the accompanying drawings.

In the figures, 1—chassis; 2—driving unit, 21, 23—driving wheel, 22—stabilizing wheel; 3—lifting unit; 31—sensing unit, 32—lifting shaft, 33—position-limit mechanism, 34—first transmission mechanism, 35—lifting motor, 36—first supporting part; 4—horizontal rotation unit, 43—second supporting part, 44—second transmission mechanism, 45—horizontal rotation motor; 5—control unit; 6—power unit, 7—direction of rotation.

DETAILED DESCRIPTION OF THE PREFERRED EMBODIMENTS

Figure 1:
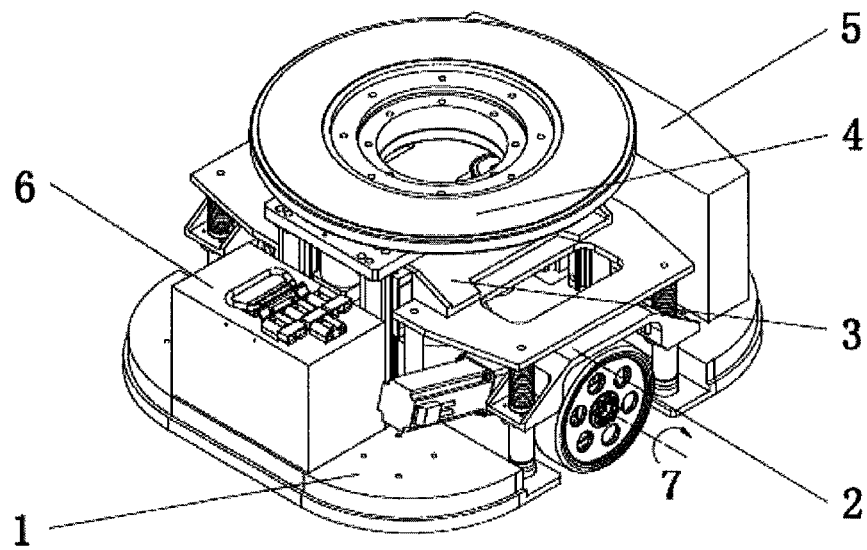
FIG. 1 is a 3D perspective view of the transporting robot of a preferred embodiment of the present invention.

As shown in FIG. 1, the transporting robot of the present invention comprises chassis 1, driving unit 2, lifting unit 3, horizontal rotation unit 4, control unit 5 and power unit 6.

Figure 2:
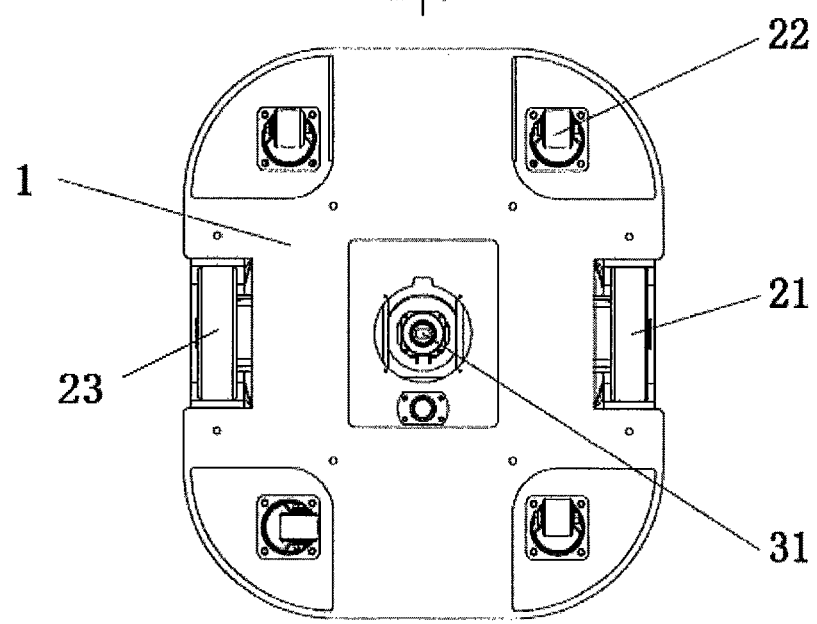
FIG. 2 is a bottom view of the transporting robot of a preferred embodiment of the present invention.
Figure 3:
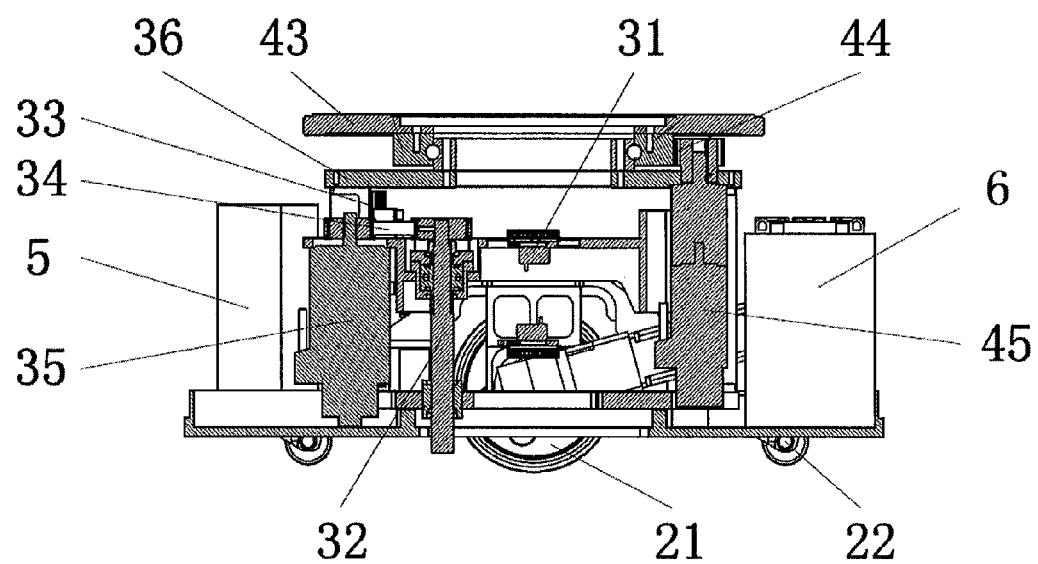
FIG. 3 is a cross-sectional view of side B shown in FIG. 2.

As shown in FIGS. 2 and 3, driving unit 2 is located on two sides of chassis 1, which carries out going forward, going backward, turning and rotation in situ through differential, by a pair of driving wheels 21, 23, performs; stabilizing wheel 22 is located on the bottom of the chassis for supporting the load of the entire body.

When both of driving wheels 21, 23 rotate in the direction of rotation 7 and with same speed of rotation, the transporting robot goes forward or goes backward; when both of driving wheels 21, 23 rotate in the opposite direction of the direction of rotation 7 and with same speed of rotation, the transporting robot goes backward or goes forward; when driving wheel 21 rotates in the direction of rotation 7, and driving wheel 23 rotates in the opposite direction of the direction of rotation 7, and with same speed of rotation, the transporting robot rotates in situ;

If setting the side of control unit 5 as the front side, setting the side of power unit 6 as the back side, when driving wheel 21 rotates in the direction of rotation 7 and driving wheel 23 also rotates in the direction of rotation 7, and when the speed of rotation of driving wheel 21 is greater than that of driving wheel 23, the transporting robot turns right; when the speed of rotation of driving wheel 21 is smaller than that of driving wheel 23, the transporting robot turns left.

Lifting unit 3 is located in the central section of chassis 1, a hollow hole is arranged internally in vertical direction for mounting sensing unit 31; lifting shaft 32 is located on one side of the hollow hole, and causes lifting unit 3 to have the freedom of translation only in the vertical direction, by position-limit mechanism 33. Lifting shaft 32 is connected to lifting motor 35 via the first transmission mechanism 34, and is used to lift or lower the first supporting part 36, and is powered by the lifting motor 35. The lifting shaft 32 can be a solid guided screw.

Horizontal rotation unit 4 is located above lifting unit 3, comprising the second supporting part 43, and is rotatably connected to the first supporting part 36 of lifting unit 3, and the second supporting part 43 is connected to rotating motor 45 via the second transmission mechanism 44, and is powered by rotating motor 45. Horizontal rotation unit 4 can cause the second supporting part 43 to rotate about the vertical axis of the hollow hole.

Control unit 5 is located on the front side (or the back side) of chassis 1 for control and communication;

Power unit 6 is located on the back side (or the front side) of chassis 1 for powering the transporting robot.

Sensing unit 31 comprises upper and lower two modules, the lower module is used for identifying the ground information and for positioning of the transporting robot, and the upper module is used for identifying the inventory holder information, and at the same time also can be used for adjusting the rotation angle of the inventory holder. Sensing unit 31 can operate visually, or by way of RFID. Sensing unit 31 can also be two-dimensional code tag; a visual sensor can be disposed externally to the transporting robot to determine the position of the transporting robot.

Position-limit mechanism 33 can be a linear guide rail, or can be a linear bearing or an oil free bushing.

The first transmission mechanism 34, can be synchronous belt transmission, or can be gear transmission.

The second transmission mechanism 44 can be gear transmission, or can be worm gear driven.

Lifting unit 3 can also be accompanied with a self-locking device for preventing the first supporting part 36 in the lifted position from diving in the event of abnormal circumstances such as power-down and the like.

Horizontal rotation unit 4 can also be accompanied with a self-locking device for driving the second supporting part 43 to rotate together while the transporting robot is rotating, without skidding.

The method for transporting inventory holder by a transporting robot of the present invention is as follows: the transporting robot walks to the bottom of the inventory holder via driving unit 2, and lifts the inventory holder via lifting unit 3; when it needs to turn, the transporting robot drives the second supporting part 43 and the inventory holder to turn together via differential motion of driving unit 2; when it needs to rotate in situ, the transporting robot rotates in situ via differential of driving unit 2, while horizontal rotation unit 4 is rotating reversely so that the second supporting part 43 and the inventory holder do not rotate; when it needs to rotate the inventory holder, the transporting robot rotates in situ via differential of driving unit 2, and drives the second supporting part 43 and the inventory holder to rotate together, or, the transporting robot drives the second supporting part 43 and the inventory holder to rotate, via the rotation of horizontal rotation unit 4.

The inventory item management system according to the present invention comprises a plurality of inventory holders and the transporting robots of the present invention, the inventory item management system transports the inventory holder with required items to the manual picking table automatically, via the transporting robots, and the transporting robots again carry the inventory holders they transported back to the designated positions after manual picking.

The preferred specific embodiments are described in greater detail hereinbefore. It is to be understood that a good many modifications and changes can be made by those of ordinary skill in the art, according to the conception of the present invention, without any creative labor. Therefore, any and all of the technical solutions that can be obtained by those skilled in the art, through logical analysis, reasoning or limited experiments, on the basis of the prior art, according to the conception of the present invention, are to be covered by the scope of protection defined by the claims.

The invention claimed is:

1. A transporting robot, wherein the transporting robot comprises a lifting unit and a horizontal rotation unit,
   the lifting unit comprises a first power unit, a lifting shaft and a first supporting part, the first power unit is configured to drive the first supporting part to move along the lifting shaft;
   the horizontal rotation unit comprises a second supporting part and a second power unit which drives the second supporting part, the second supporting part and the first supporting part are connected rotatably; and
   the first power unit comprises a first self-locking mechanism, and the first self-locking mechanism is configured to lock the first supporting part when the first power unit is powered down.

2. The transporting robot according to claim 1, wherein the lifting unit has a hollow hole, the hollow hole is disposed in vertical direction internal to the lifting unit, the lifting shaft is located on one side of the hollow hole.

3. The transporting robot according to claim 1, wherein the lifting shaft is a solid guided screw.

4. The transporting robot according to claim 1, wherein the transporting robot further comprises a driving unit, the driving unit comprises two driving wheels, and the driving wheels are configured to cause the transporting robot to go forward, go backward, turn and rotate in situ.

5. The transporting robot according to claim 1, wherein the first power unit comprises a first transmission mechanism, the first transmission mechanism is a synchronous belt transmission mechanism or a gear transmission mechanism.

6. The transporting robot according to claim 1, wherein the second power unit comprises a second transmission mechanism, and the second transmission mechanism is a gear transmission mechanism or a worm gear driven mechanism.

7. The transporting robot according to claim 1, wherein the second power unit comprises a second self-locking mechanism, and the second self-locking mechanism is configured to lock the second supporting part and the first supporting part.

8. The transporting robot according to claim 1, wherein the lifting unit further comprises a position-limit mechanism, the position-limit mechanism is configured to limit the movement of the first supporting part in a direction perpendicular to the ground.

9. The transporting robot according to claim 8, wherein the position-limit mechanism is one of linear guide rail, linear bearing and oil free bushing.

10. The transporting robot according to claim 2, wherein the transporting robot further comprises a sensing unit.

11. The transporting robot according to claim 10, wherein the sensing unit is located within the hollow hole, and the sensing unit is an upward-looking sensor and/or a downward-looking sensor.

12. The transporting robot according to claim 10, wherein the sensing unit is a reference mark, and the reference mark is an active mark or a passive mark.

13. The transporting robot according to claim 12, wherein the active mark is a RFID tag.

14. The transporting robot according to claim 12, wherein the passive mark is a pattern tag, a machine-readable code tag or a text tag.

15. A method for transporting inventory holder by a transporting robot, wherein the method comprises the following steps:

Step 1. The transporting robot moves to the bottom of the inventory holder located in a first position, lifting the inventory holder;

Step 2. The transporting robot moves to a second position, carrying the inventory holder;

Step 3. The transporting robot puts down the inventory holder, and then moves away from the bottom of the inventory holder;

wherein the transporting robot comprises a driving unit, a lifting unit and a horizontal rotation unit, the lifting unit comprises a first power unit, a lifting shaft and a first supporting part, the first power unit is configured to drive the first supporting part to move along the lifting shaft; the horizontal rotation unit comprises a second supporting part and a second power unit which drives the second supporting part, and the second supporting part and the first supporting part are connected rotatably; the lifting unit has a hollow hole, the hollow hole is disposed in vertical direction internal to the lifting unit, and the lifting shaft is located on one side of the hollow hole the first power unit comprises a first self-locking mechanism, and the first self-locking mechanism is configured to lock the first supporting part when the first power unit is powered down.

16. The method according to claim 15, wherein when the transporting robot turns carrying the inventory holder, the transporting robot and the inventory holder are stationary relative to each other.

17. The method according to claim 15, wherein when the transporting robot rotates in situ carrying the inventory holder, the transporting robot causes the transporting robot to rotate in situ by the driving unit, meanwhile, the horizontal rotation unit rotates reversely so that the second supporting part and the inventory holder remain stationary relative to the ground.

18. The method according to claim 15, wherein when the transporting robot carries the inventory holder and revolves the inventory holder, the transporting robot causes the transporting robot to rotate in situ by the driving unit, and drives the second supporting part and the inventory holder to rotate together, or the transporting robot drives the second supporting part and the inventory holder to rotate by the rotation of the horizontal rotation unit.

19. An inventory item management system, comprising a plurality of inventory holders and transporting robots, wherein the transporting robot comprises a lifting unit and a horizontal rotation unit, the lifting unit comprises a first power unit, a lifting shaft and a first supporting part, and the first power unit is configured to drive the first supporting part to move along the lifting shaft; the horizontal rotation unit comprises a second supporting part and a second power unit which drives the second supporting part, the second supporting part and the first supporting part are connected rotatably;

the first power unit comprises a first self-locking mechanism, and the first self-locking mechanism is configured to lock the first supporting part when the first power unit is powered down.

20. The inventory item management system according to claim 19, wherein the lifting unit has a hollow hole, the hollow hole is disposed in vertical direction internal to the lifting unit, and the lifting shaft is located on one side of the hollow hole.

21. The inventory item management system according to claim 19, wherein the lifting unit further comprises a position-limit mechanism, and the position-limit mechanism is configured to limit the movement of the first supporting part in a direction perpendicular to the ground.

22. The inventory item management system according to claim 19, wherein the lifting shaft is a solid guided screw.

23. The inventory item management system according to claim 19, wherein the transporting robot further comprises a sensing unit, and the sensing unit is an upward-looking sensor and/or a downward-looking sensor.

24. The inventory item management system according to claim 19, wherein the transporting robot further comprises a driving unit, the driving unit comprises two driving wheels, and the driving wheels are configured to cause the transporting robot to go forward, go backward, turn and rotate in situ; the first power unit comprises a first transmission mechanism, and the first transmission mechanism is a synchronous belt transmission mechanism or a gear transmission mechanism; the second power unit comprises a second transmission mechanism, and the second transmission mechanism is a gear transmission mechanism or a worm gear driven mechanism.

25. The inventory item management system according to claim 19, wherein the second power unit comprises a second self-locking mechanism, and the second self-locking mechanism is configured to lock the second supporting part and the first supporting part.

26. The inventory item management system according to claim 19, wherein the transporting robot further comprises a sensing unit, the sensing unit is a reference mark, and the reference mark is an active mark or a passive mark.

27. The inventory item management system according to claim 26, wherein the active mark is a RFID tag, and the passive mark is a pattern tag, a machine-readable code tag or a text tag.

* * * * *